UNITED STATES PATENT OFFICE.

ROBERT B. WOOD, OF RICHMOND, VIRGINIA.

IMPROVEMENT IN MEDICINAL BEVERAGES.

Specification forming part of Letters Patent No. 205,713, dated July 2, 1878; application filed June 24, 1878.

*To all whom it may concern:*

Be it known that I, ROBERT B. WOOD, of the city of Richmond, in the county of Henrico and State of Virginia, have invented certain new and useful Improvements in Beverages; and I do hereby declare that the following is a full, clear, and exact description thereof, which will enable others skilled in the art to which it pertains to make and use the same.

This invention relates to a class of compounds used for instantly producing a draft of effervescing and refreshing water.

The separate ingredients entering into my invention have long been used in the form of powders put up in separate papers, to be dissolved separately and then mixed together, so as to form soda-water; but what distinguishes my compound from all others is the employment of the several ingredients hereinafter specified, and put up in the manner and style stated.

It is well known that tartaric acid, when put up in paper, absorbs more or less water from the atmosphere, and often to so large an extent as to liquefy, either wholly or in part, the quantity put up for the purpose of neutralizing the accompanying paper of alkali.

For the purpose of obviating this, I name, as being first used by me, the acid in solution, in the proportion of twenty-five grains to each fluid dram of water put up in a vial ready for use. In a paper box I put up twenty grains of pure bicarbonate of soda, mixed with half-ounce of pulverized sugar and such medicinal powders as may be desired, to the contents of which, dissolved in half a tumblerful of water, is to be stirred in one tea-spoonful of the dissolved acid, and drank while effervescing.

Upon this detail of the ingredients and proportions of the materials I state that my pocket soda-fountain consists of two or more small boxes containing the bicarbonate of soda and sugar, as above described, and a vial containing the tartaric acid in solution, in the proportion mentioned, and a spoon for measuring and stirring in the acid. These small boxes, the vial of acid, and the spoon, being put up in a box and handsomely labeled, constitute my pocket soda-fountain.

I am aware that it is not new to place in the same package the powders to produce effervescence in separate papers or bottles, and that to produce acid drinks the sugar and acid are bottled together or separate in a dry form, and with or without carbonate of soda; but these are objectionable, for the reason of deliquescence, and such, therefore, I do not desire to claim; but

What I claim as new is—

1. In a package for producing effervescent and medicinal beverages, the combination of the dry carbonates and flavoring or medicinal powders with a suitable acid in solution and of a definite strength, substantially as shown.

2. The package for producing beverages herein set forth, consisting in two or more boxes or packages, each containing the carbonate with flavor in a powdered and dry form, and a bottle of the acid solution, with a suitable measure, all inclosed in one box, for the purpose set forth.

In testimony that I claim the foregoing as my own I affix my signature in presence of two witnesses.

R. B. WOOD.

Witnesses:
D. P. COWL,
W. E. CHAFFEE.